United States Patent [19]

Röth et al.

[11] Patent Number: 4,643,577
[45] Date of Patent: Feb. 17, 1987

[54] LENGTH MEASURING APPARATUS BASED ON THE DUAL LASER BEAM INTERFEROMETER PRINCIPLE

[75] Inventors: Rudolf Röth; Claus Werckmeister, both of Schlüchtern, Fed. Rep. of Germany

[73] Assignee: Wero Ohg Röth & Co., Schlüchtern, Fed. Rep. of Germany

[21] Appl. No.: 628,238

[22] Filed: Jul. 6, 1984

[30] Foreign Application Priority Data

Jul. 15, 1983 [DE] Fed. Rep. of Germany ....... 3325549

[51] Int. Cl.$^4$ ............................................. G01B 9/02
[52] U.S. Cl. ................................... 356/358; 356/363
[58] Field of Search ............................. 356/358, 363

[56] References Cited

U.S. PATENT DOCUMENTS

| 3,588,254 | 6/1971 | Rhoades ..................... 356/358 X |
| 3,661,463 | 5/1972 | Brainard et al. ............... 356/358 |
| 4,311,390 | 1/1982 | Phillips ........................ 356/358 |

FOREIGN PATENT DOCUMENTS

| 53199 | 6/1982 | European Pat. Off. .......... 356/358 |
| 1773346 | 2/1973 | Fed. Rep. of Germany ..... 356/358 |
| 60306 | 5/1981 | Japan ............................ 356/358 |

*Primary Examiner*—Vincent P. McGraw
*Assistant Examiner*—Matthew W. Koren
*Attorney, Agent, or Firm*—Felfe & Lynch

[57] ABSTRACT

Length measuring apparatus with position sensor (12), in accordance with the dual beam laser interferometer principle, having a laser light source (16) supplied by a power source (48), a beam splitter (18) disposed in its optical axis for dividing the light beam into a measuring light beam and a reference light beam aligned at an angle thereto, a movable mirror (19) joined to the position sensor and reflecting the measuring light beam parallel to the optical axis with a transverse offset, and an at least partially reflecting additional optical element (20). This optical element (20) can be either in the form of a second mirror or in the form of a second beam splitter. In the area of interference of the beam paths lies at least one photodetector (21) whose output or outputs are connected to an evaluating circuit (37) which has a counting system for counting the light/dark sequences including a detection of direction of movement, and to a digital display system (3). In accordance with the invention, the laser light source is a laser diode (16) for the production of laser light which is essentially monomodal both laterally, transversely and longitudinally and has a coherence length that corresponds at least to the length to be measured. The evaluation circuit (37) also has at least one system for eliminating the influences of operational and environmental parameters of the length measuring apparatus. The apparatus is extraordinarily compact, and easy to learn to operate as regards signal processing and regulation. It is consequently suitable both for manual measuring devices (gauges) and for machine devices.

12 Claims, 5 Drawing Figures

LENGTH MEASURING APPARATUS BASED ON THE DUAL LASER BEAM INTERFEROMETER PRINCIPLE

The invention relates to a length measuring apparatus having a position sensor, which operates on the dual laser beam interferometer principle. The apparatus has a laser light source operated by a power supply, a beam splitter disposed in its optical axis for dividing the light beam into a measuring light beam and a reference light beam aligned at an angle thereto, a mirror connected to the position sensor and reflecting the measuring light beam with a transverse offset parallel to the optical axis, an at least partially reflecting additional optical element (second mirror or second beam splitter), and at least one photodetector situated in the interference area of the beams, whose output or outputs are connected to an evaluating circuit having a counting means for counting the light-dark sequences including direction recognition, and having a digital display system.

A position sensor is the movable part of the measuring apparatus which detects the position of the object being measured, such as for example a feeler which can be placed on a workpiece surface, or it is a moving part of a machine tool to which the movable mirror of the interferometer is fastened.

Such measuring apparatus are described, with a variety of embodiments, in the article by Kunzmann entitled, "Anwendung des Laser-Interferometer in der Fertigungsmesstechnik" in "Annals of the CIRP Vol. 28/1/1979", pages 311 to 316. It is possible to use either a beam splitter and two reflectors, or two beam splitters and one reflector. A very well known measuring apparatus is the so-called Michelson interferometer, which is likewise described in the literature cited above.

In this kind of interferometer, a light beam is split into two beams, one of which can be referred to as a reference light beam and the other as the measuring light beam. A semireflective mirror which is disposed in the beam path at an angle of 45 degrees can be used as the beam splitter, or a cube formed by cementing two prisms together, the cemented surface being also disposed in the beam path at a 45 degree angle.

After traveling over independent paths, the measuring and reference light beams are reunited to form an interference beam and in this manner interfere. Depending on the phasing of the two beams with respect to one another, the interference beam can assume an amplitude between the sum of the individual amplitudes (constructive interference) and zero (destructive interference). If the movable mirror performs a continuous movement, the interference signal passes through a sequence of signals of different brightness (so-called interference fringes or bands) which can be detected by a photodetector and converted to a stream of electrical pulses. By means of two photodetectors offset from one another as regards phasing, not only are the light/dark transitions detected, but the direction of movement of the movable mirror is evaluated. The displacement "s" of the movable mirror is computed from the number of nulls "m" and the wavelength of the light "$\lambda$": $s = m \times \lambda/2$.

The number of light/dark transitions is thus a measure of the displacement of the movable mirror relative to the stationary optical elements. This method of interferometric measurement of length is to be classed among the group of the incremental measurements.

To obtain a clean interference signal, the set-up must be so aligned that the two beams meet precisely parallel and polarized in the same sense. The use of so-called retroreflectors as mirrors, such as the so-called triple mirrors, assures that the incident beam is always parallel to the reflected beam. Furthermore, it is necessary, by means of an appropriate parallel offset, to prevent reflected light from getting back to the light source and causing disturbances of the interference.

The above considerations assume that the light source emits an infinitely long train of waves of precisely one frequency. In practice, a light source delivers a mixture of locally defined light particles, so-called photons, of different polarization and frequency. Even strictly monochromatic light sources such as lasers have a certain frequency bandwidth. This bandwidth is the reason why the photons of the light beam do not have the fixed phase relation necessary for interference over just any arbitrary distance. The distance over which this fixed phase relationship exists is called the coherence length. The narrower the laser frequency bandwidth is, the greater is the coherence length. The coherence length, therefore, forms the maximum limit of the wavelength difference of the two beams, i.e., twice the length of movement of a mirror or reflector.

If the wavelength difference exceeds the permissible value, the contrast in the interference diminishes to such an extent that it is no longer possible to count the dark/light transitions. A similar, but spatially periodical effect in the contrast produces the emission of several discrete frequency modes, each of narrow bandwidth. The position of the individual modes and the contour of the so-called amplification curve (= the envelope curve of the intensity maxima) are greatly influenced by temperature and other external parameters. Especially the sensitivity of frequency stability to temperature changes leads to the necessity of keeping the output power of the light source constant by means of a regulating circuit. One must strive, therefore, to amplify the individual modes considerably over the adjacent modes.

Another condition for good contrast in the interference signal is the approximate equality of the intensity of the two beams. Since the optical path lengths of the two beams are different from one another, the light source must emit a very well focused light beam.

The citation from Kunzmann given in the beginning specifies, on page 311, a helium-neon laser, i.e., a so-called gas laser, as the light source for the laser interferometer. Such lasers, however, have a number of disadvantages in practical application: the thermal effects, the warming of the laser tube, and the encapsulation of the relatively large units result in measuring apparatus of large dimensions and great weight, which can not be used for manual measurements. The known gas lasers require complex apparatus and auxiliary units for regulation, and especially for cooling, which further increase their bulk. The problems occurring in the use of the known gas lasers due to oil vapors, dust particles and other contamination have an undesirable influence on the measurements.

It is therefore the object of the invention to devise a measuring apparatus of the kind described in the beginning, which while providing reliable measurements by the interferometer principle even over relatively greater displacements, i.e., in the decimeter and meter range, will have dimensions that are much smaller than those of the known measuring apparatus using gas lasers and will require no extensive auxiliary apparatus for the actual laser operation.

The achievement of the above object is accomplished in accordance with the invention, in the length measuring apparatus described in the beginning, by the fact that the laser light source is a laser diode for the production of laser light which is substantially monomodal both laterally, transversely and longitudinally, and has a coherence length that corresponds at least to the length to be measured, and that the length measuring apparatus has at least one system for the elimination of the influence of operational and environmental parameters.

The use of semiconductor and laser diodes in a number of special measuring apparatus other than length measuring apparatus is known in itself:

German Offenlegungsschrift No. 31 31 232 discloses a semiconductor ring laser apparatus which forms a so-called gyroscope. In such an apparatus, two laser light beams run contrariwise in a circle or polygon with an at first fixed phase relationship. If the circle or polygon is rotated, an extremely small phase shift occurs, which is smaller than one wavelength, so that there is no provision for counting the light/dark transitions. Instead, the phase shift is the actual measured magnitude. In such gyroscopes a greater coherence length is not even desired, since in that case undesirable effects would be produced by scatter and by superposition. The avoidance of a greater coherence length is brought about by the fact that the reflector surfaces at the ends of the waveguide are at a definitely 90-degrees different angle to the longitudinal axis of the waveguide. In this manner, no monomodal laser light develops, and the coherence length is decidedly less than one millimeter. The known laser is custom-made and is not usable for length measuring apparatus.

In the article, "Fiber Optic Sensors," by Taylor et al., published on the occasion of the "First European Conference on Integrated Optics" by The Institution of Electrical Engineers, 1981, pages 99 to 101, the use of monomodal laser diodes in conjunction with fiber optics, for the measurement of sound pressures, magnetic fields, acceleration, temperatures and rotation is disclosed. Means are used which, under the influences described above, undergo extremely slight changes of length, so that, again, path differences occur between the interfering beams, which are smaller than one wavelength, so that, again, there is no need to strive for short coherence lengths to avoid undesirable influences. What is involved in this case again is length changes and phase changes which are in the micrometer and $2\pi$ range, so that the systems described are not suitable for length measurements.

In the article by Petermann, "Semiconductor Laser Noise in an Interferometer System," published in IEEE Journal of Quantum Electronics, July 1981, pages 1251 to 1256, and in the article by Dandridge, "Single-mode diode laser phase noise," published in Appl. Phys. Lett., January 1981, pages 77–78, measuring systems are described for the measurement of laser noise which make use of the Michelson principle, among others. Petermann describes a multimode laser which again is not usable for length measurements. Dandridge describes the use of a monomodal laser diode, Hitachi Model 1400 CSP, which according to the data sheet has an emission wavelength between 820 and 880 nm. The laser diode, however, is operated in the unstabilized or free-running state, and the noise level was tested in relationship to the wavelength difference, which amounted to as much as 40 cm. On account of the manner of operation, the coherence length was of the order of 30 micrometers, so that no suitability for length measuring apparatus can be discerned. The displacement of the mirror, amounting to up to 40 cm, is in any case no indication of the coherence length. Basically, noise results in poor contrast in the interference phenomena, so that counting the light/dark transitions is neither possible nor in any way provided for.

Laser diodes are sold, for example, under the name, "CQL 13 A Collimator Pen," by Valvo, and under the model numbers HLP 1000, HLP 2000 and HLP 3000 by Hitachi. The applications cited, however, are irrelevant to those with which we are concerned. The known laser diodes are devised as light sources for glass fiber optics, as well as for the sensing of video disks and recorded sound disks, data transmission and storage, alarm systems, etc.

The laser diode sold by Hitachi under the designation HLP 7801E has proven to be well suited for the system of the invention. It is also offered for the sensing of video disks and recorded sound disks, and has a coherence length, not required for this purpose, of about 2 to 3 meters, and it is furthermore extraordinarily inexpensive, since its price amounts to less than 10% of the price of the laser diodes named above. The laser diode HLP 7801 E has the advantage that its operating conditions (operating temperature, injection current) are adjustable to levels which result in an emission wavelength of almost precisely 800 nm. The wavelength can be very easily adapted to a binary system, and leads to directly usable numerical results without involving a great deal of computation.

It has surprisingly been found that such laser diodes, which have lengths of about 20 mm and diameters of 6 to 8 mm and include a built-in collimator, are outstandingly suitable as laser light sources for length measuring apparatus based on the two-beam interferometer principle. Despite their simple construction and simple conditions of operation, they satisfy the requirements indicated above for the laser light sources needed for such measuring apparatus. In particular, they also have the great coherence length that is essential in such measuring apparatus.

Hitachi's laser diode HLP 7801 E emits, at an output power of about 5 mW, mainly one mode of a wavelength of around 800 nm, i.e., the maximum of this mode is many times above the maxima of the adjacent mode. The light beam is in the infrared range and is invisible to the eye.

In length measurements whose relative and absolute errors must be kept extremely low, still other influences must be heeded: The emission wavelength of laser diodes depends on their operating current and on the so-called injection current (operating current). Basically, therefore, these operational parameters must be adjusted and regulated to definite and constant levels within certain very narrow limits. It is also pointed out that the difficulty this involves can be limited if the effects of intensity fluctuations and wavelength fluctuations of the laser diode are compensated additionally or exclusively within the evaluating circuit.

Another determinant factor in the propagation of the laser beams is the density of the medium in the beam path, which in turn is determined by pressure, temperature and humidity.

The solution of the problem thus has, in addition to the above-described laser diode, at least one system for eliminating the influences of operating and environmental parameters. For this there are the embodiments which will be further explained below:

On the one hand, the laser diode is easily provided with a system for stabilizing its operating temperature. For example, the laser diode can be connected to a Peltier-effect element. In this case the temperature of the laser diode is detected by a temperature sensor, and the Peltier-effect element is controlled accordingly through an associated control circuit. In the present state of the art, the temperature can easily be stabilized at $\pm 0.1$K., and if necessary even at 0.01K. In the latter case, the absolute measurement error for a measurement length of 100 mm would be less than 0.1 micrometer.

The injection current can be kept constant by connecting the diode to a current-stabilized, controllable current source. The relationship with the emission wavelength in the Hitachi laser diode HLP 7801 E is around $6.4 \times 10^{-10}$ nm per milliampere. This effect is not too important to the absolute measurement, but higher-frequency disturbances can substantially affect the contrast necessary for counting.

The subject of the invention can also be further developed advantageously by associating with the laser diode another photodetector whose output signal is fed through an analog-to-digital converter to a microcomputer in which a comparison can be performed with a standard intensity, and by enabling the corresponding output signal to be fed as a correction signal through a digital-to-analog converter to the source of the current of the laser diode.

Any fluctuations in the intensity of the laser beam are thus communicated to the additional photodetector, which can be directly associated with the laser diode, so that any intensity fluctuations caused by any current fluctuations can be immediately detected and compensated.

With regard to conditions in the beam path of the apparatus, it is especially advantageous, according to a further development of the invention, if the output signals of sensors for temperature, pressure and humidity in the beam path are fed through an analog-to-digital converter to a microcomputer in which an operation can be performed for the compensation of these factors. This compensation is a purely mathematical measure, i.e., the said influences on the count are compensated in the computer before the latter feeds the count to the digital read-out system.

It has been pointed out above that the apparatus of the invention can have systems for stabilizing the operating temperature and injection current, in order to keep the operating parameters, and thus the emission wavelength, within the narrowest possible limits. Current-stabilized, controllable and adjustable power sources--so-called "constant-current" devices, are easily available, but it has already been pointed out that it is also possible, by appropriate regulation measures including an additional photodetector whose output signal is connected through an analog-to-digital converter to a microcomputer in which a comparison can be made with a given standard intensity value, and with the corresponding output signal fed as a correction signal through a digital-to-analog converter to the power source for the power supply of the laser diode, to produce a corresponding correction signal and compensate any deviations with regard to the injection current. These measures are to be considered as alternative possibilities, which, however, can also support one another.

An alternative possibility, which relates to the optical processes in the beam paths and to the electronic data processing of the counts, is, in another further development of the invention, characterized by the fact that, in addition to the interferometer system with its movable mirror, a reference interferometer system is present, having a mirror which is fixed in relationship to the other optical elements, the reference interferometer system being fed with the light from the same laser diode, and that the output of the reference interferometer system is connected to an additional counter for counting the light/dark sequences and the detection of the direction of movement, for the purpose of an operation to compensate for the wavelength fluctuations.

This reference interferometer system detects, of course, those changes in the laser radiation which are due to a change in the operating parameters (temperature, injection current) in the same or a similar system. The reference interferometer system, however, also detects changes connected with the density of the medium in the beam path (pressure, temperature, humidity). In other words, any change in the emission wavelength and the wavelength in the beam path up to the movable mirror results in a corresponding change in the beam path to the fixed mirror. Depending on the magnitude of the change of state, this results in the reference interferometer system in a light/dark sequence and a corresponding counting action, these changes taking place several orders of magnitude more slowly than, for example, the traveling movement of the movable mirror.

It is to be pointed out, of course, that the above-described regulating and compensating measures, which are all measures for the elimination of the influences of operating and environmental parameters, can also be combined with one another, thereby minimizing the amount of circuitry involved and maximizing the reading accuracy.

The solution afforded by the invention is especially to be seen in contrast to other known incremental meters in the handy form of so-called gauges, i.e., which permit the performance of manual measurements on workpieces. Such gauges include, for example, those in which the displacement of glass standards bearing gratings produces, in conjunction with light sources and photodetectors, pulses which are converted in signal processing devices to the desired measurement and are preferably displayed digitally. The invention, although it is just about as handy as the known manual gauges, has the extraordinary advantage that its absolute accuracy is a power of ten greater than in the case of glass standards. Such glass standards operate with a grating which is divided every 10 micrometers and produces sinusoidal pulses. In the invention, a half wavelength of light produces a sinusoidal pulse, thereby achieving substantially greater accuracy. Furthermore, no reference temperature has to be associated with the absolute accuracy of measurement, as it does, for example, in the case of the coefficient of expansion of the glass standards.

The invention, however, is not limited just to manual length measuring apparatus, but is also applicable, to special advantage, in length measuring systems which are used in cooperation with machine controls and measuring machine controls. As a result of the extremely small dimensions, the apparatus of the invention also distinguishes itself advantageously in those measuring systems as well. Thus, the retrofitting of mechanical production machines with the apparatus of the invention is also possible, since it requires very little space, yet has all of the functions of the complex known laser measuring devices. In contrast to the latter, the apparatus of the invention has greater life an sturdiness on account of the exclusive use of semiconductor components, so that, even when used under rough operating conditions, no disturbances will be produced in the machine controls. Likewise, its use is possible on height meters, also referred to as "vertical length measuring apparatus," and on jigs using scribers for scribers level lines above a reference platform (surface plate).

To make possible a high velocity of movement of the position sensor and of the movable mirror combined with reliable signal evaluation, it is especially advantageous for the at least one photodetector to be followed by a counter block whose outputs are fed to a signal processing circuit for the conversion of the counter pulses to digital signals corresponding to the movement of the movable mirror, for the digital display. With commonly available counter modules of this kind, counting frequencies in the megahertz range are allowable.

By means of a signal 90 degrees out of phase (which can be obtained, for example, with a quarter-wavelength plate) and two receiver diodes, which are necessary anyway for detection of direction of movement, the counting frequency can be quadrupled in the circuit by an exclusive OR circuit (EXOR circuit) in conjunction with an output flank detector, and thus a corresponding increase in the resolving power can be achieved. The resolving power thus is increased just the same as if, instead of the laser diode with an emission wavelength of 800 nm, one with an emission wavelength of only 200 nm were used.

It is especially advantageous to house the laser diode in a casing in whose opposite wall a guide tube is disposed whose axis is parallel to the optical axis of the collimator, and in which the sensing probe (position sensor) with the movable mirror is mounted for longitudinal displacement. Such an apparatus, including all of the functional groups required for obtaining the measurements and the display can be used manually, i.e., can be held in the hand. At the same time the paths of the measuring and reference light beams are hermetically sealed within the same casing and within the guide tube, so that external influences cannot interfere with the beam paths. It is especially possible to make the casing itself and the guidance of the sensing probe in the guide tube so as to be sealed such that the entire internal structure of the instrument is reliably protected. The protection can be further enhanced by filling the casing with an inert gas and keeping it under pressure.

As it was mentioned above, the apparatus of the invention is also suitable for length measuring systems which are used in cooperation with machinery controls and measuring machine controls. Such a measuring instrument is characterized in accordance with the further invention in that the laser diode with the collimator is housed in a casing which is connected to the first part of a machine, that the position sensor with the movable mirror is connected to a second part of the machine which is movable relative to the first part, and that the position sensor and casing are connected by a variable-length guard means enveloping the optical axis. In an especially advantageous manner, the guard means consists of telescoping tubes.

It is especially advantageous, with regard to the fixed arrangement of the individual optical elements of the interferometer system, if the laser diode and the collimator are contained in an adapter sleeve at the end of which, in the area of the intersection "K" of the measuring and reference light beams, the beam splitter, the at least partially reflecting optical element, and the at least one photodetector are disposed.

It is an important feature that the coherence length corresponds at least to the length to be measured. Since the laser rays travel about twice the length of the beam, it is consequently especially desirable for the coherence length to correspond at least to twice the length that is to be measured. As the coherence length increases, the contrasts with regard to the light/dark transitions increase, so that, as regards the evaluation or counting of the interference effect, one should strive for the greatest possible coherence length that can be achieved at reasonable cost.

SPECIFICATION

The measurement principle, the basic signal processing, as well as two embodiments of the invention will be explained below in conjunction with FIGS. 1 to 6.

Figure 1:
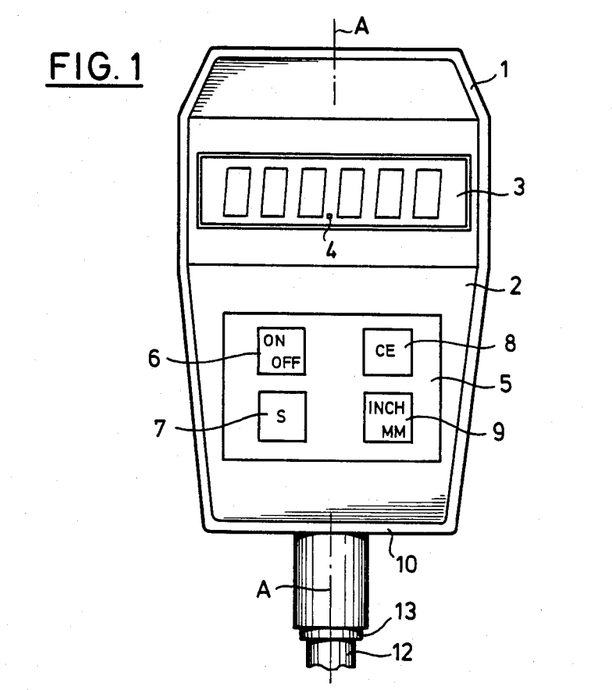
FIG. 1 is a front view of a measuring apparatus for manual use.

FIG. 1 presents an external view of a casing 1 having on its front face 2 a digital display 3 having three places before and three places after the decimal point 4. The externally visible part of the display system is an LCD.

Under the display system 3 is a keyboard 5 with an ON-OFF key 6, a start key 7, a delete key 8, and a conversion key 9 for the selective display of the reading in inches and in millimeters. It is apparent that the keyboard 5 can also contain a very much greater number of keys to permit the entry, for example, of numbers and prepared programs for particular calculations, or for running programs. Such a keyboard 5a is represented in FIG. 3.

The casing 1 has the bottom 10 in which a guide tube 11 (FIG. 2) is fixedly inserted. A position sensor 12 is sealingly guided in this guide tube. Between the position sensor and the guide tube is another telescope tube 13 by which the entire travel of the position sensor 12 can be further increased.

Figure 3:
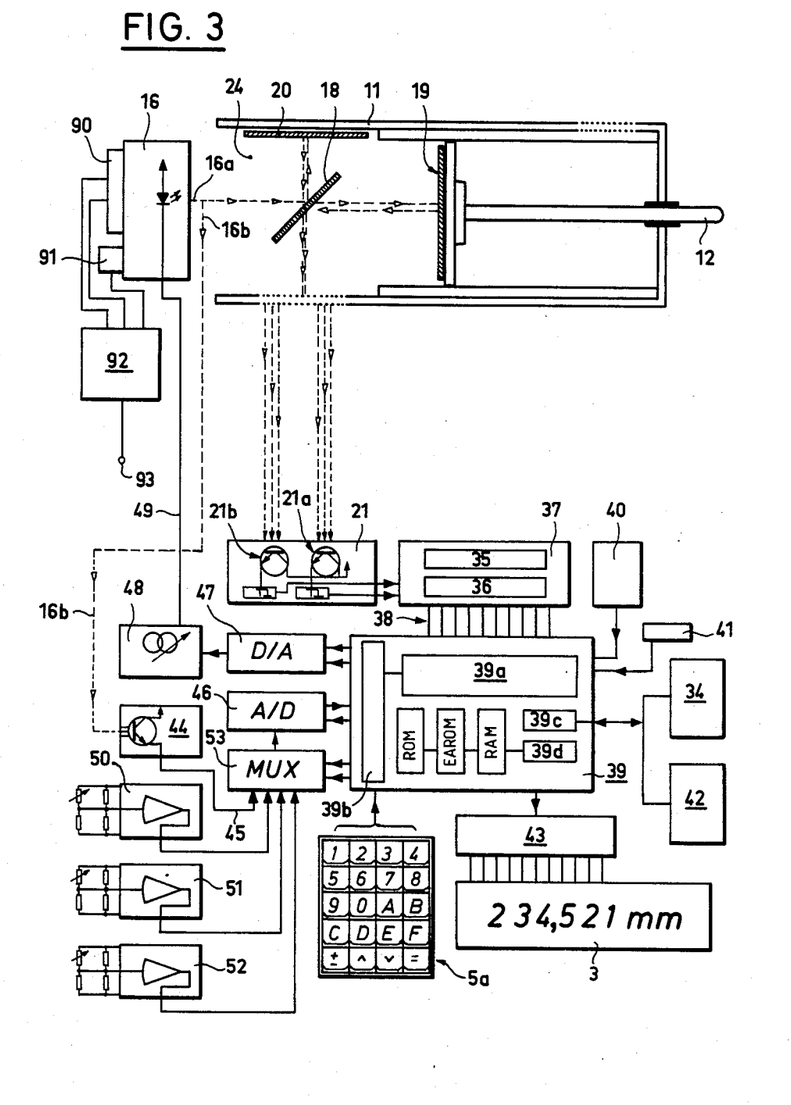
FIG. 3 is a diagrammatic representation of a two-beam laser interferometer system in conjunction with an electrical signal processing system.

FIG. 3 is drawn in different scale, but identical parts are provided with the same references.

Referring again to FIG. 2, the case 1 has a roof 14 to which the laser diode 16 in accordance with the invention is fastened by means of an adapter sleeve 15. The laser diode is of the model HLP 7801 E sold by Hitachi, having a collimator 17 disposed in the front part and indicated only in broken lines. The collimator defines an optical axis A—A which is simultaneously the axis of the entire system. The adapter sleeve 15 made of aluminum has a lateral flat to which a device 90 (Peltier element) and a heat sensor are attached for good thermal conduction, for the purpose of stabilizing the operating temperature.

Figure 2:
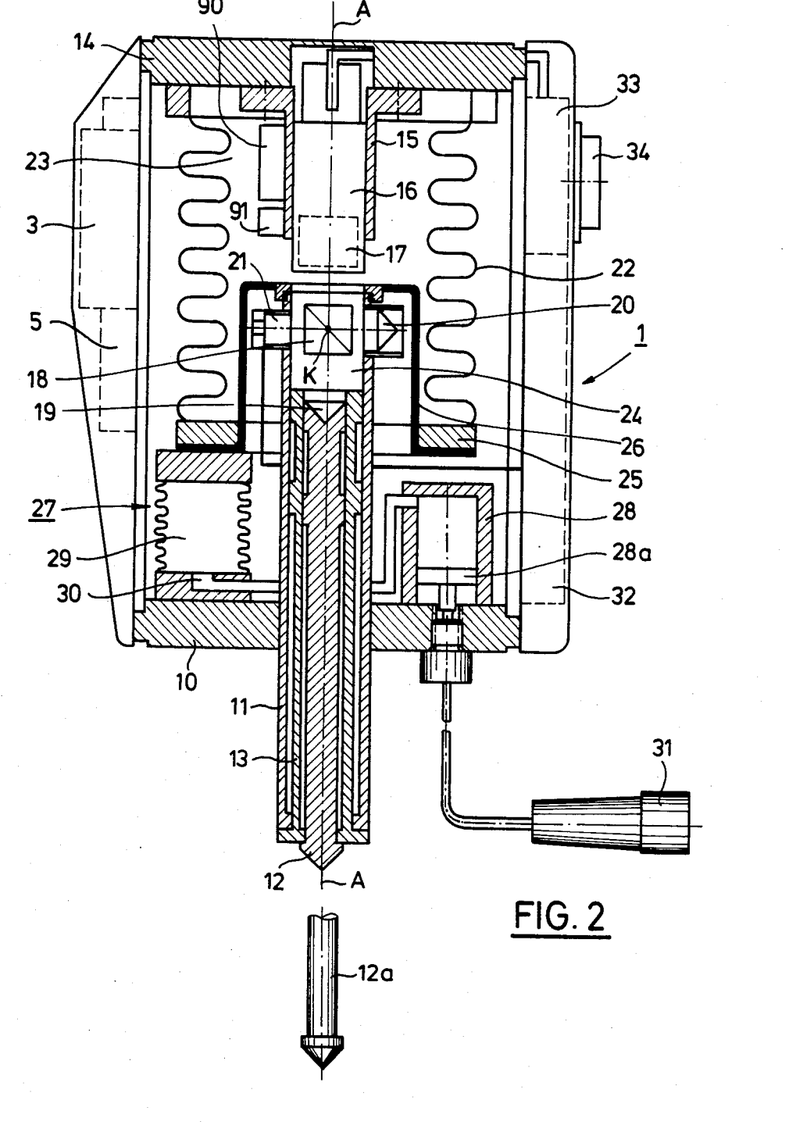
FIG. 2 is a longitudinal section through the object of FIG. 1, taken along the optical axis of the collimator.

On the axis A—A there is disposed a beam splitter 18 by which the light beam is divided into a measuring light beam running parallel to the optical axis and a reference light beam running at 90° thereto. In the path of the measuring light beam, a mirror 19 is disposed at the inner end of the position sensor 12, and is in the form of a so-called triple mirror which reflects the light always with an offset parallel to the direction of the incident light. In the path of the reference light beam which is reflected at 90 degrees there is disposed a fixed optical element 20 which in the embodiment herein described is also in the form of a triple mirror. The measuring light beam and the reference light beam have each about half of the intensity of the light beam emerging from the collimator 17, on account of the transmittance of the beam splitter.

The light reflected by the mirror 19 is deflected by the beam splitter 18 in the same proportion to a photodetector 21. The same photodetector also receives the portion of the reference light beam that is reflected to the beam splitter 18 by the optical element 20, and passes through the beam splitter in the same direction. The beam splitter 18, optical element 20 and photodetector 21 are fixedly installed, in the illustrated arrangement, in the inner end of the guide tube 11, in the area of the intersection "K" of the measuring and reference light beams. In this manner an interference beam is formed ahead of the photodetector 21 by the superposition of the measuring and reference light beam, and when the mirror 19 moves in the direction of the axis A—A, it has the above-described influence on the photodetector 21. The embodiment represented in FIG. 2 corresponds to the Michelson interferometer.

In the casing 1 a pressure-resistant wall 22, which in the present case is formed by a metal bellows, forms a chamber 23 which communicates with the inner chamber 24 of the guide tube 11. By a reduction of the volume of the chamber 23 a pressure is created—since it is sealed off from the exterior—which is transferred to the inner ends of the position detector 12 and telescope tube 13 and causes them to extend to make contact with an object. Such an extended state is indicated at 12a. This produces a rapid series of light/dark transitions at the photodetector 21 due to the interference, and this is expressed at the output of the photodetector 21 as a series of electrical pulses which is convertible in the following signal processor represented in FIG. 3 to values which can be displayed.

As shown in FIG. 2, the chamber 23 is surrounded by a bellows in which the laser diode 16 is also contained. The one end of the bellows is joined in a pressure-resistant manner to the wall 14 of the casing 1, while the other end is joined, also in a pressure-resistant manner, to a movable annular flange 25 which surrounds the guide tube 11.

A likewise pressure-resistant junction between the annular flange and the guide tube is formed by a rolling membrane 26, which like the bellows is obtainable commercially as a standardized component. The result is that a movement parallel to the axis A—A by the annular flange 25, whose principal plane is perpendicular to the axis A—A, will result in a corresponding reduction of the volume within the chamber 23, so that the desired extending movement of the position sensor 12 is accomplished.

To enable the movement of the annular flange 25 to be produced from without, the flange is attached to a drive means 27 which consists of a hydraulic pressure transmitter 28 and three pressure receivers 29 distributed equidistantly about the circumference. The pressure receivers 29 are supported on the wall 10 of the casing and are connected each by a line 30 to the pressure transmitter. The pressure transmitter 28 consists of a not otherwise referenced cylinder and a piston 28a which can be operated externally by a mechanical actuator 31. The pressure receivers again consist of bellows, but it is to be understood that a piston-type receiver can also be used here; conversely, the pressure transmitter 28 can also be in the form of a bellows. By the transmission of the same pressure from pressure transmitter 28 to a plurality of pressure receivers 29 a corresponding mechanical advantage can be achieved.

Also represented in broken lines in FIG. 2 are the display system 3 (LCD), the keyboard 5, and a signal processor 32 which will be explained further in conjunction with FIG. 3. A battery 33 is disposed in a battery compartment; by means of an external connection 34 (multiple pin connector) connections can be made to machine controls, external program storages, computers and printers.

In FIG. 3, again, identical parts or parts serving the same function are provided with the same reference numbers. The photodetector 21, which is disposed at the interference beam but is considerably smaller than represented, contains two phototransistors 21a and 21b, which are disposed at such a distance apart in the direction of displacement of the position detector 12 that the light/dark pulses occur with a phase shift of 90 degrees. The two series of signals serve for the detection of direction in a direction circuit 35 which, like the counter block 36, is part of a counter module 37. Type 4516 CMOS and type 74 LF 193 forward and reverse counters can be used preferentially as the counter blocks. A plurality of outputs 38 run from the counter module 37 to a microcomputer 39, which is manufactured by NEC, Japan, under the model number 80 C 49. This is an 8-bit computer which, if more comprehensive computer operations (measurement and control) are required, can also be replaced by a 16-bit computer. The microcomputer 39 has a processor 39a, a parallel input-/output, decoders 39c and 39d, and memory blocks identified as ROM, EAROM and RAM, according to their functions. The microcomputer 39 receives its time pulses from a clock 40. All of the counters can be reset by means of a reset key 41. The external terminal 34 has already been explained in conjunction with FIG. 2; an additional external terminal 42 can be connected to a computer which is not shown.

The microcomputer 39 receives its input commands through the previously described keyboard 5a. It is connected through a display control circuit 43 to the display system 3.

As in FIG. 3, a heat sensor 91 and a system 90 for stabilizing the operating temperature are attached, through a joint providing good thermal conductivity, to the laser diode 16. From the heat sensor 91 a signal conductor leads to an analog controller 92 which receives its power supply through a terminal 93. The controller 92 is connected by two unreferenced conductors to the system 90, so that it is possible in this manner to control the operating temperature of the laser diode 16 at a constant level within extraordinarily narrow limits.

From the light beam 16a coming from the laser diode 16, a partial beam 16b is derived ahead of the beam splitter 18 and is led to an additional photodetector 44 which serves for the measurement of intensity and feeds its output signal through a conductor 45 and an analog-to-digital converter 46 to the microcomputer 39. In the latter a comparison is made with a given intensity level, and any differences are fed as correction signals through a digital-to-analog converter 47 to a power source 48 which can be maintained at constant current and whose output is connected by a line 49 to the laser diode 16. In the manner described, the laser diode 16 is regulated to constant emission levels (wavelength and intensity).

Also connected to the microcomputer 39 are the outputs of sensors 50, 51 and 52, which actually are disposed in the beam path, i.e., in the guide tube 11, sensor 50 being a temperature sensor, sensor 51 a pressure sensor, and sensor 52 a humidity sensor. The management of the outputs of these sensors is performed, like those of the output of the photodetector 44, by a multiplexer 53, i.e., the scanning is performed at time intervals. In the microcomputer 39 there is performed a compensating operation for the levels that are measured.

Figure 4:
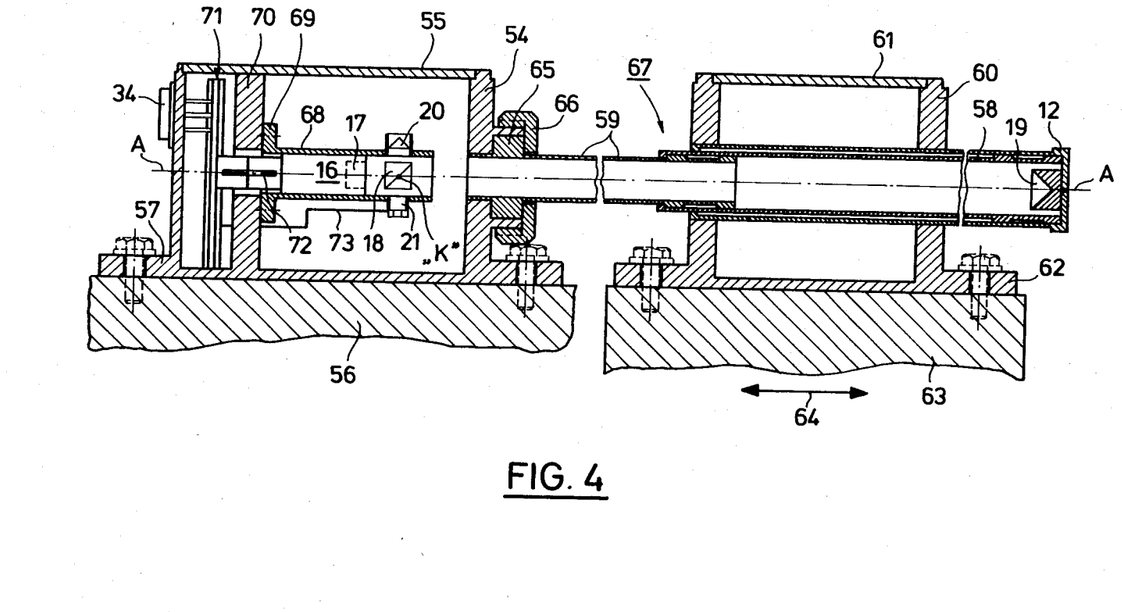
FIG. 4 is a longitudinal cross section through a measuring apparatus for use in a machine control.

In the embodiment represented in FIG. 4, the laser diode is housed with the collimator 17 in a case 54 having a cover 55. The case is joined to a first part 56 of a machine, such as the bed of the machine for example, by means of a mounting flange 57. In this manner the casing 54 is made stationary. The position sensor 12 is in the present case in the form of the outermost guide tube for the telescope tubes 58 and 59. The position sensor 12 is contained in another case 60 having a cover 61, the case being joined by a mounting flange 62 to a second part 63 of the machine. This second part 63 is in the present case displaceable in the direction of the double arrow 64 along the axis A—A; all that is important here, however, is the relative movement between the individual assemblies. Part 63 is, for example, the tool rest of a machine tool.

The movable mirror 19 is attached to the inner end of the position sensor 12 in such a manner that the light which it reflects is reflected in the direction of the axis A—A (collimator axis) or parallel thereto. The distance of this mirror consequently corresponds precisely to the position of the movable part 63. The telescope tubes 58 and 59 run coaxially with the axis A—A and are well sealed one to the other and guided in the position sensor 12 which also is in the form of a tube. The telescope tube 59 which can move farthest with respect to the position sensor 12 has a flange 65 by which it is joined by means of a clamping nut 66 to the case 54. Position detector 12 and telescope tubes 58 and 59 together form a means of protection 67 for the measuring light beam on its courses to mirror 19 and back.

As also indicated in FIG. 4, laser diode 16 and collimator 17 are disposed in an adapter sleeve 68 at whose extremity, at the intersection "K" of the measuring and reference light beams, the at least partially reflecting optical element 20 and the at least one photodetector 21 are provided. The adapter sleeve 68 is aligned with the protective means 67. The adapter sleeve is joined by a flange 69 to a partition wall 70 in the case 54, behind which there is situated a platen 71 with the signal processing system (not shown). The laser diode 16 is connected to this platen by a plug connection 72 and the photodetector 21 is connected to it by a conductor 73. From the platen 71, leads which are not referenced run to an external connector 34.

Figure 5:
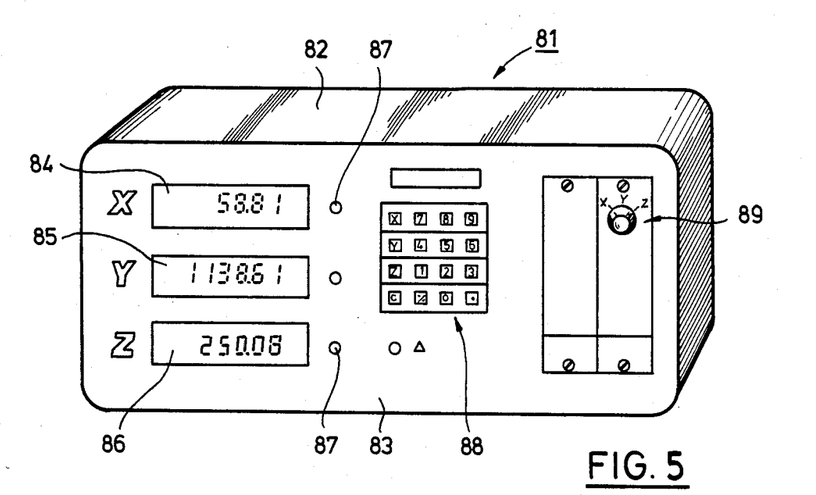
FIG. 5 is a perspective view of an external display instrument.

FIG. 5 shows an external display unit 81, which is connected, for example, to the external outputs 34 of three interferometer systems corresponding to FIGS. 4. The axes of the latter are disposed on a machine in an X-Y-Z coordinate system, so that a three-dimensional detection of objects is possible. The unit has a case 82 with a front panel 83 in which three display fields 84, 85 and 86 are provided for the coordinates X, Y and Z. To the right thereof are seen the reset keys 87 for the resetting of the individual displays. Also on the right is a keyboard 88 by which standard values for the coordinates X, Y and Z can be entered and certain programs and computing operations can be initiated. The front panel has, lastly, another selector switch 89 for the setting of the desired coordinates. The external display unit can be attached very easily to a machine and permits a central control of the readings in a minimum of space.

We claim:

1. Length measuring apparatus with position sensor means comprising:

a laser light beam source comprising a laser diode for the production of simultaneously laterally, transversely and longitudinally monomodal laser light with a coherence length which corresponds at least to the length to be measured, a beam splitter diposed in the optical axis of said laser light beam source for dividing the light beam into a measuring light beam and a reference light beam aligned at an angle thereto, a movable mirror connected to the position sensor means and reflecting the measuring light beam with transverse offset parallel to the optical axis, additional at least partially reflecting optical means for reflecting at least a portion of the reference light beam to provide an interference range of the beam paths of the reflected portion of the reference light beam and the reflected measuring light beam, at least one photodetector lying in said interference range of the beam paths, evaluating circuit means coupled to said at least one photodetector and having counting means for counting the light/dark sequences including direction recognition, said laser diode having a system for the stabilization of its operating temperature, the length measuring apparatus comprising a current-stabilized, controllable power source and said laser diode being connected to said current-stabilized, controllable power source, the length measuring apparatus including an additional photodetector, an analog-to-digital converter, a microcomputer, a digital-to-analog converter, said laser diode for intensity measurement being associated with said additional photodetector whose output signal is connected through said analog-to-digital converter to said microcomputer in which a comparison can be made with a given standard intensity value to provide an output signal, and the output signal of said microcomputer corresponding to said output signal of said additional photodetector being fed as a correction signal through said digital-to-analog converter to said power source, the length measuring apparatus including sensors for temperature, pressure and humidity in the beam path and providing output signals, and the output signals of the sensors for temperature, pressure and humidity being coupled by said analog-to-digital converter to said microcomputer in which a compensation operation is performed for the magnitudes of temperature, pressure and humidity.

2. Length measuring apparatus in accordance with claim 1 in which said laser diode is one having an emission wavelength of 800 hm.

3. Length measuring apparatus in accordance with claim 1, which includes a digital display system, said microcomputer being effective to provide a display of the maximum, minimum or optimized measurement of the relation of the measurement to a tolerance field.

4. Length measuring apparatus in accordance with claim 3, in which said microcomputer includes program storage means for at least one measuring program and its measurement processing.

5. Length measuring apparatus in accordance with claim 4, in which said program storage means is effective to record computation programs for signal processing.

6. Length measuring apparatus in accordance with claim 1, which includes three separate length measuring apparatus individually having three different beam paths in the X-direction, Y-direction and Z-direction in an X-Y-Z coordinate system, and a common display unit responsive to the outputs of said three length measuring apparatus.

7. Length measuring apparatus in accordance with claim 1, which includes a casing housing said laser diode which includes a collimator, said casing having a wall opposite to said laser diode in which a guide tube is disposed whose axis is parallel to the optical axis (A—A) of the collimator and in which the position sensor comprises a feeler which, with the movable mirror, is longitudinally displaceable.

8. Length measuring apparatus in accordance with claim 7, in which said guide tube has an inner end including a region of the intersection of the measurement light beam and reference light beam and in which said beam splitter, said at least partially reflecting optical means and said at least one photodetector are disposed at the inner end of the guide tube in said region of the intersection of the measurement light beam and the reference light beam.

9. Length measuring apparatus in accordance with claim 7, which includes a digital display system which is integrated with said laser diode in said casing.

10. Length measuring apparatus in accordance with claim 1, including a case which is joined to the first part of a machine and in which said laser diode including a collimator is housed, and in which the position sensor means with said movable mirror is joined to a second part of the machine, which second part is movable relative to the first part, and which apparatus includes a variable length protecting means enveloping the optical axis and in which apparatus the position sensor means and the case are joined together by said variable length protecting means.

11. Length measuring apparatus in accordance with claim 10, which includes an additional case which is joined to the second part of the machine and in which the position sensor is housed in said addition case.

12. Length measuring apparatus in accordance with claim 10, which includes an adapter sleeve at whose end in the region of the intersection of the measuring and reference light beam said beam splitter, said at least partially reflecting optical element and said at least one photodetector are disposed, said adapter sleeve housing said laser diode and said collimator.

* * * * *

UNITED STATES PATENT AND TRADEMARK OFFICE
CERTIFICATE OF CORRECTION

PATENT NO. : 4,643,577

DATED : February 17, 1987

INVENTOR(S) : Rudolf Röth, et al.

It is certified that error appears in the above-identified patent and that said Letters Patent is hereby corrected as shown below:

Column 8, line 20 for "SPECIFICATION" read the paragraph:

-- Additional advantageous developments of the apparatus of the invention will appear from the rest of the specification. --.

Column 13, line 5 for "hm" read -- nm --.

Signed and Sealed this

Eighth Day of August, 1989

*Attest:*

DONALD J. QUIGG

*Attesting Officer*   *Commissioner of Patents and Trademarks*